United States Patent [19]

Hauff

[11] Patent Number: 4,627,647

[45] Date of Patent: Dec. 9, 1986

[54] WALL FEEDTHROUGH FITTING

[76] Inventor: Werner Hauff, Herlbühlsstr. 19, 7925 Dischingen-Ballmertshofen, Fed. Rep. of Germany

[21] Appl. No.: 707,877

[22] Filed: Mar. 4, 1985

[30] Foreign Application Priority Data

Mar. 6, 1984 [DE] Fed. Rep. of Germany ....... 3408122
Aug. 30, 1984 [DE] Fed. Rep. of Germany ....... 3431805

[51] Int. Cl.$^4$ .............................................. F16L 5/00
[52] U.S. Cl. .................................... 285/189; 285/215; 285/216; 285/217; 285/162; 285/192; 285/196; 285/387; 285/921; 403/194; 403/195; 403/197; 174/65 G; 248/56
[58] Field of Search ............... 285/189, 162, 192, 196, 285/215, 216, 217, 387, 421, DIG. 22; 52/220; 403/194, 195, 197, 238, 243; 174/65 G, 151; 248/56

[56] References Cited

U.S. PATENT DOCUMENTS

| | | | |
|---|---|---|---|
| 1,192,927 | 8/1916 | Mosher | 285/215 |
| 1,788,366 | 1/1931 | Anderson | 285/216 |
| 1,835,155 | 12/1931 | Harbert | 248/56 |
| 3,498,642 | 3/1970 | Berger | 285/189 |
| 3,548,079 | 12/1970 | Jones | 285/158 |

Primary Examiner—Cornelius J. Husar
Assistant Examiner—Douglas W. Hanson
Attorney, Agent, or Firm—Karl F. Ross; Herbert Dubno

[57] ABSTRACT

A feedthrough assembly for a conduit has, as is known, a wall formed with a throughgoing passage extending along an axis and having a radially inwardly directed wall surface. An elastomeric adapter sleeve has an outer surface complementarily radially outwardly engaging the wall surface, an inner surface snugly surrounding and engaging a conduit passing axially through the passage, and an axially backwardly open and annular groove between the surfaces and of a predetermined radial width in a relaxed condition of the sleeve. A tightening ring of a radial dimension greater than the width of the groove fits so tightly in the groove as to press the sleeve radially outward against the surface of the passage and inward against the conduit. The ring is formed of at least two similar sector-shaped ring parts having the same radius of curvature as the groove and having ends provided with angularly interfitting formations.

7 Claims, 4 Drawing Figures

WALL FEEDTHROUGH FITTING

FIELD OF THE INVENTION

The present invention relates to a wall feedthrough fitting. More particularly this invention concerns such a fitting which allows a pipe, hose, or cable to pass hermetically through a wall.

BACKGROUND OF THE INVENTION

In most types of construction, particularly when firecode, it is necessary to completely block a passage through a wall that is provided to allow a conduit to pass through the wall, to stop any leakage, in particular of flame and vapors generated in a fire, through the wall.

A standard feedthrough assembly for a conduit has a wall formed with a throughgoing passage extending along an axis and having a radially inwardly directed wall surface. An elastomeric adapter sleeve has an outer surface complementarily radially outwardly engaging the wall surface, an inner surface snugly surrounding and engaging a conduit passing axially through the passage, and an axially open and annular groove between the surfaces and of a predetermined radial width in a relaxed condition of the sleeve. An annularly continuous tightening ring of a radial dimension greater than the width of the groove fits so tightly in the groove as to press the sleeve radially outward against the surface of the passage and inward against the conduit.

U.S. Pat. No. 3,548,079 of Jones describes such a system wherein the tightening ring is of triangular section, isosceles with an axially extending base and is formed, like the groove in the sleeve, with a screwthread. Thus this ring can be screwed into the sleeve to expand it radially as described above. In addition at least one end of the sleeve is constituted so it can be heat-shrunk around the conduit.

Thus such a feedthrough seal must be radially relatively thick, so that it can accommodate a relatively thick ring on its outside face. Too thin a sleeve will only seal adequately at the outer side, and will not seal at all on the opposite, inside end. The parts of such an arrangement are so difficult to mold and are of such complex construction that these feedthrough fittings are quite expensive. In addition it is fairly complex to mount such an arrangement, as the conduit must be passed through the tightening ring before being poked through the rest of the fitting, a step often forgotten so the installer neglects to seal the joint.

OBJECTS OF THE INVENTION

It is therefore an object of the present invention to provide an improved wall feedthrough fitting.

Another object is the provision of such a wall feedthrough or bulkhead fitting which overcomes the above-given disadvantages, that is which is simple and inexpensive to manufacture, and that can be installed around a conduit even after it has been passed through the rest of the fitting.

SUMMARY OF THE INVENTION

A feedthrough assembly for a conduit has, as is known, a wall formed with a throughgoing passage extending along an axis and having a radially inwardly directed wall surface. An elastomeric adapter sleeve has an outer surface complementarily radially outwardly engaging the wall surface, an inner surface snugly surrounding and engaging a conduit passing axially through the passage, and an axially backwardly open and annular groove between the surfaces and of a predetermined radial width in a relaxed condition of the sleeve. A tightening ring of a radial dimension greater than the width of the groove fits so tightly in the groove as to press the sleeve radially outward against the surface of the passage and inward against the conduit. The ring according to this invention is formed of at least two similar sector-shaped ring parts having the same radius of curvature as the groove and having ends provided with angularly interfitting formations, although it would be perfectly to possible to make the ring of three or more identical parts.

Thus with the system according to the invention the ring can be fitted together around the conduit after same is emplaced. Thus the conduit is threaded through the normally lined and calibrated passage, and once it is in its permanent placement, the ring is fitted angularly together around it and screwed into the groove of the adapter sleeve. The ability of such a split sleeve to resist deformation in a radial direction is modest, but since the element is fitted into a complementary circular groove this weakness is irrelevant. On the other hand the radial integrity of the ring is more than sufficient for its function of pushing the inner surface of the ring in and the outer surface out. It is also possible to make this ring a relatively tight fit around the conduit, since it is not necessary to painstakingly thread it along the conduit as same is fitted through the passage, for a very tight seal.

According to this invention the rings have angularly abutting ends and the formations include at least one tangentially projecting pin formed on the end of at least one of the ring parts and a complementary recess on the respective end of the respective ring part. In addition the ring has an axially forwardly tapered portion and a generally cylindrical portion of the radial dimension and extending axially backward therefrom. The cylindrical portion, as compared to the wholly tapered prior-art rings, fits between the substantially cylindrical inner and outer surfaces of the groove so it ensures that the sleeve is pressed outward and inward along a substantial portion of its length, not just at the outer edge.

In accordance with another feature of this invention the ring and the groove each have a radial outer surface and a radial inner surface at least one of which is formed with a screwthread ridge. Normally for ease of manufacture the ring has the ridge and the groove is smooth-surfaced so that the ridge bites into the groove when the ring is screwed into same. The screwthread ridge only lies on the ring surface at the tapered forward portion of same but normally is formed on the outer and inner ring surfaces.

In addition according to this invention the ring has a an outermost portion connected to the outer cylindrical portion and substantially thicker than same. This outermost ring portion is formed with recesses adapted to fit with a tool so the ring can be screwed tightly into the sleeve.

DESCRIPTION OF THE DRAWING

The above and other features and advantages will become more readily apparent from the following, reference being made to the accompanying drawing in which.

SPECIFIC DESCRIPTION

Figure 1:
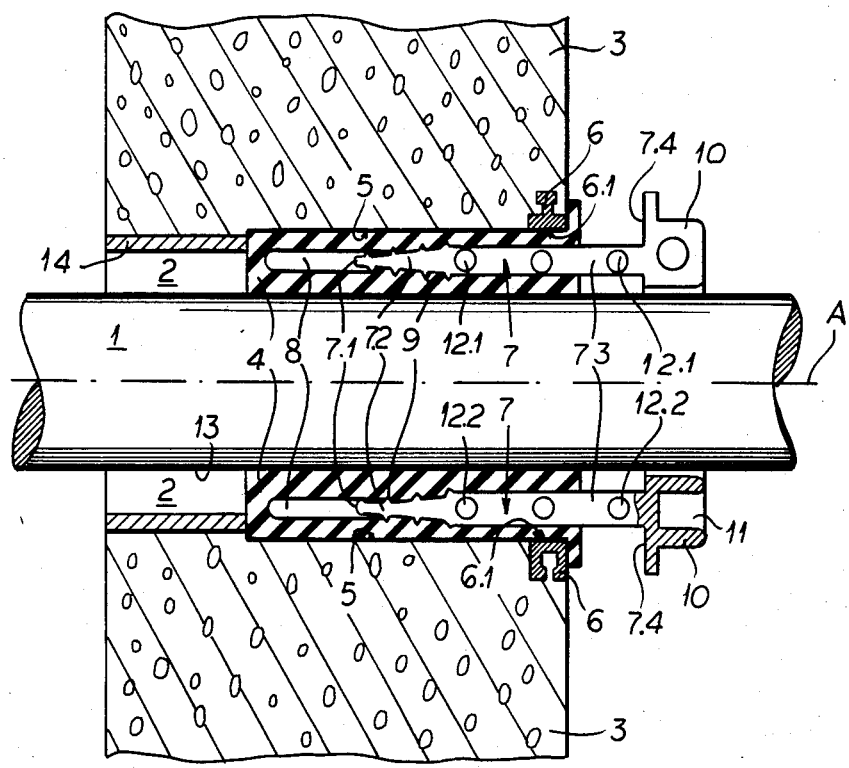
FIG. 1 is an axial section through the feedthrough assembly according to this invention.

As seen in FIG. 1 a conduit 1, which can be a pipe, cable, or the like, extends centered on an axis A through a cylindrical passage 2 in a wall 3, here of concrete and provided on its inner region with a liner 14 and at its outer edge with a lining ring 6. The fitting according to this invention basically comprises an elastomeric sleeve 4 centered on the axis A and having an outer surface complementary to and snugly engaging the inner surface 5 of the passage 2 and the identical and contiguous inner face 6.1 of the ring 6. The inner surface of this sleeve 4 presses against the outer surface 13 of the conduit 1.

The sleeve 4 is formed with an axially centered outwardly open groove 8 having confronting cylindrical inner and outer surfaces that taper slightly, about 1°, to facilitate demolding the item. A tightening ring 7 is received in this groove 8 and is formed of a tapered front portion 7.2 having a pointed front edge 7.1 and a substantially cylindrical back portion 7.3 that actually tapers slightly to facilitate demolding the ring 7. The front portion 7.2 is formed on its frustoconical inner and outer surfaces with screwthread ridges 9 of the same hand. In addition the rear or outermost portion 7.4 of the ring forms a flange that normally extends out past the wall 5 or 6.1 and that is formed in turn with axially backwardly open cylindrical pockets 11 into which teeth of a tightening tool can fit.

Figure 2:
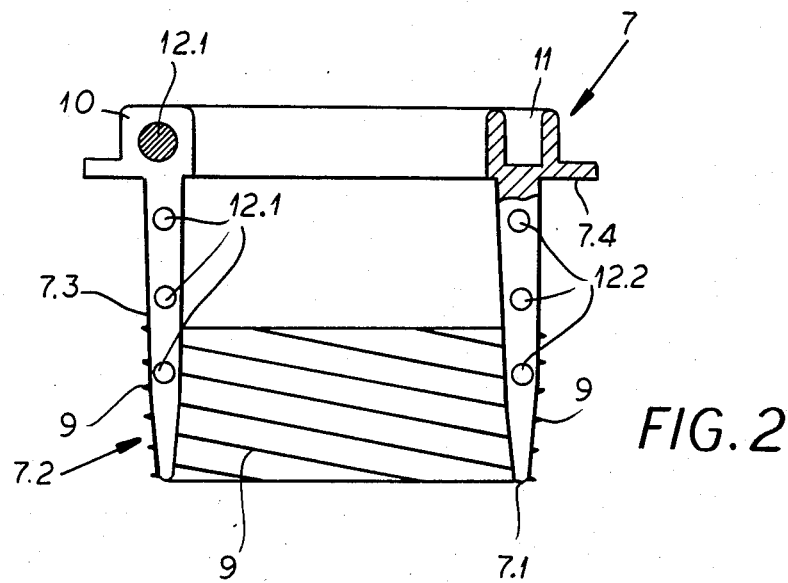
FIG. 2 is an axial section through the tightening ring of the assembly.
Figure 3:
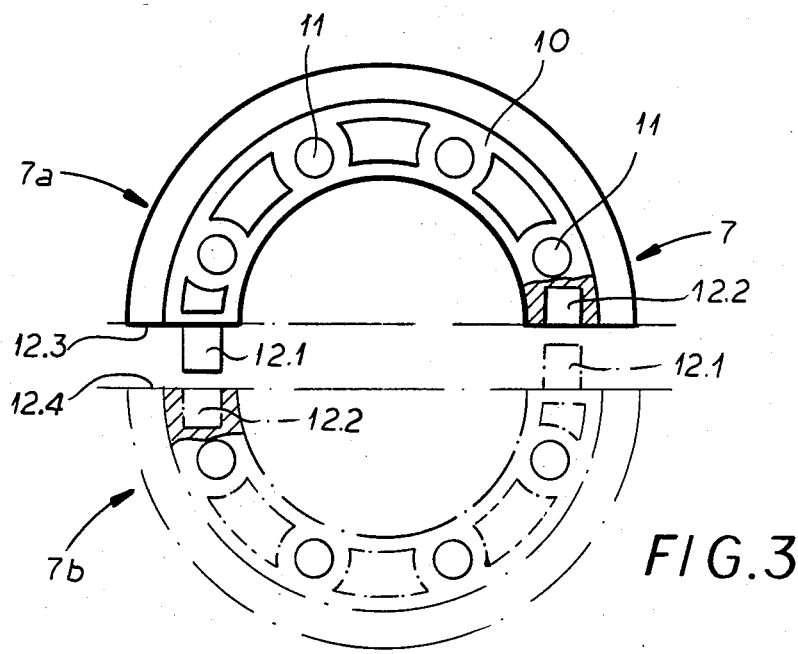
FIG. 3 is a top exploded view of the tightening ring.
Figure 4:
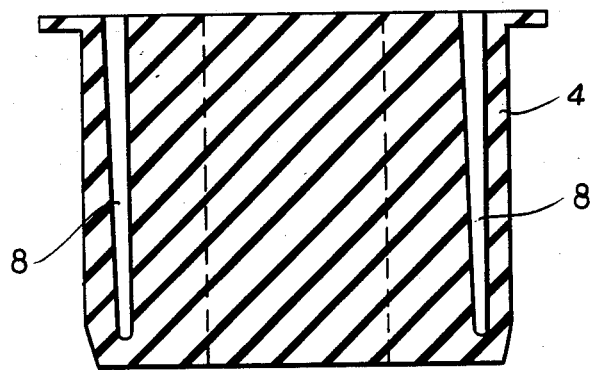
FIG. 4 is a generally axial section through the adapter sleeve according to the invention.

In accordance with this invention as best seen in FIGS. 2 and 3 the ring 7 is formed of two identical semicylindrical parts 7a and 7b having end faces 12.3 and 12.4 lying on a common plane diametral to the axis A so that they can fit flatly together. In addition pins 12.1 and recesses 12.2 are formed on these surfaces 12.3 and 12.4 and can fit into each other. Thus as illustrated in FIG. 2 each part 7a has three axially spaced pins 12.1 that engage angularly in the complementary recesses 12.2, thereby effectively aligning the two parts 7a and 7b.

It is therefore possible to fit the conduit 1 through the passage 2 and, only after it is permanently emplaced, to fit the ring 7 to it and screw it into the groove 8, thereby effectively tightening the assembly together and making a very hermetic seal. The passage 2 can be of standard dimensions and the installer can have a whole series of sleeves 4 and rings 7 for conduits of different diameters.

I claim:

1. A feedthrough fitting for a conduit, the fitting comprising:

a wall formed with a throughgoing passage extending along an axis and having a radially inwardly directed wall surface, whereby a conduit passes axially through the passage;

an elastomeric adapter sleeve having
- an outer surface complementarily radially outwardly engaging the wall surface,
- an inner surface snugly surrounding and engaging the conduit, and
- an axially backwardly open and annular groove between the inner and outer sleeve surfaces, having generally cylindrical and confronting inner and outer groove surfaces, and being between the inner and outer groove surfaces of a predetermined radial width in a relaxed condition of the sleeve; and a tightening ring having an axially forwardly tapered portion and a generally cylindrical portion extending axially backward therefrom and of a radial dimension greater than the width of the groove between the groove surfaces and fitting so tightly in the groove so as to press the sleeve radially outward against the surface of the passage and inward against the conduit along the full length of the cylindrical portion, the ring being formed of at least two similar sector-shaped ring parts having the same radius of curvature as the groove and having ends provided with angularly interfitting formations.

2. The feedthrough fitting defined in claim 1 wherein the rings have angularly abutting ends and the formations include at least one tangentially projecting pin formed on the end of at least one of the ring parts and a complementary recess on the respective end of the respective ring part.

3. The feedthrough fitting defined in claim 1 wherein the ring has a radial outer surface and a radial inner surface, at least one of the ring surfaces being formed with a screwthread ridge, the groove being smooth-surfaced, whereby the ridge bites into the groove when the ring is screwed into same.

4. The feedthrough fitting defined in claim 3 wherein the screwthread ridge is provided on the one ring surface only at the tapered forward portion of same, the cylindrical portion being smooth and unridged.

5. The feedthrough fitting defined in claim 3 wherein the screwthread ridge is on the outer and inner ring surfaces.

6. The feedthrough fitting defined in claim 1 wherein the ring has an outermost portion connected to the outer cylindrical portion and substantially thicker than same.

7. The feedthrough fitting defined in claim 6 wherein the outermost ring portion is formed with recesses adapted to fit with a tool.

* * * * *